United States Patent
Zhu et al.

(10) Patent No.: US 11,477,158 B2
(45) Date of Patent: Oct. 18, 2022

(54) METHOD AND APPARATUS FOR ADVERTISEMENT ANTI-BLOCKING

(71) Applicant: WANGSU SCIENCE & TECHNOLOGY CO., LTD., Shanghai (CN)

(72) Inventors: Yichen Zhu, Shanghai (CN); Weijun Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/485,691

(22) PCT Filed: Oct. 30, 2018

(86) PCT No.: PCT/CN2018/112682
§ 371 (c)(1),
(2) Date: Sep. 29, 2021

(87) PCT Pub. No.: WO2020/073374
PCT Pub. Date: Apr. 16, 2020

(65) Prior Publication Data
US 2022/0078161 A1    Mar. 10, 2022

(30) Foreign Application Priority Data

Oct. 11, 2018    (CN) .......................... 201811184685.4

(51) Int. Cl.
*H04L 61/2596*    (2022.01)
*H04L 67/02*    (2022.01)
(Continued)

(52) U.S. Cl.
CPC ..... *H04L 61/2596* (2013.01); *G06Q 30/0251* (2013.01); *G06Q 30/0256* (2013.01);
(Continued)

(58) Field of Classification Search
None
See application file for complete search history.

(56) References Cited

U.S. PATENT DOCUMENTS 7,058,633 B1 * 6/2006 Gnagy ................ G06F 16/9566
707/E17.115
8,589,810 B2 * 11/2013 Huslak .................. G06F 16/954
715/760
(Continued)

FOREIGN PATENT DOCUMENTS

CN    106156093 A    11/2016
CN    106657105 A    5/2017
(Continued)

OTHER PUBLICATIONS

The China National Intelleectual Property Administration (CNIPA) The China Search Report for 201811184685.4 dated Aug. 4, 2020 15 Pages.

*Primary Examiner* — Lashonda Jacobs-Burton (57) ABSTRACT

The present disclosure provides a method and an apparatus for advertisement anti-blocking in the technical field of internet. The method includes receiving a first access request of a terminal for a target webpage, and obtaining webpage content of the target webpage; rewriting uniform resource locators (URLs) at a plurality of levels in the webpage content into corresponding anti-blocking URLs according to a preset encryption algorithm, and returning rewritten webpage content to the terminal; restoring the anti-blocking URLs to the URLs at the plurality of levels according to a preset decryption algorithm, when receiving second access requests of the terminal for the anti-blocking URLs; and obtaining resources pointed to by the URLs at the plurality of levels and returning the resources to the terminal. By
(Continued)

using the present disclosure, the cost of advertisement anti-blocking for a website provider can be reduced.

12 Claims, 4 Drawing Sheets

(51) Int. Cl.
  *G06Q 30/02* (2012.01)
  *H04L 101/604* (2022.01)
(52) U.S. Cl.
  CPC ......... *G06Q 30/0277* (2013.01); *H04L 67/02* (2013.01); *G06Q 30/0241* (2013.01); *G06Q 30/0244* (2013.01); *H04L 2101/604* (2022.05)

(56) References Cited

U.S. PATENT DOCUMENTS

| | | | | |
|---|---|---|---|---|
| 8,745,753 | B1* | 6/2014 | Gottlieb | G06Q 30/0277 726/26 |
| 9,679,315 | B2* | 6/2017 | Carasso | H04L 67/02 |
| 9,881,323 | B1* | 1/2018 | Agronow | G06Q 30/0277 |
| 10,037,552 | B1* | 7/2018 | Lorimor | G06Q 30/0242 |
| 10,237,339 | B2* | 3/2019 | Chivukula | H04L 41/5025 |
| 10,262,343 | B1* | 4/2019 | Orekhov | G06F 21/51 |
| 2006/0235960 | A1* | 10/2006 | Lai | H04L 63/0227 709/224 |
| 2007/0239732 | A1* | 10/2007 | Dixit | G06F 16/9566 707/E17.115 |
| 2009/0254633 | A1* | 10/2009 | Olive | G06Q 30/02 709/218 |
| 2013/0312081 | A1* | 11/2013 | Shim | H04L 63/1425 726/13 |
| 2016/0140611 | A1* | 5/2016 | Schler | G06F 16/9535 705/14.55 |
| 2016/0253718 | A1* | 9/2016 | Carasso | H04L 63/029 705/14.73 |
| 2016/0301735 | A1* | 10/2016 | Lind | G06Q 30/0277 |
| 2017/0109797 | A1* | 4/2017 | Boffa | H04L 67/146 |
| 2017/0264712 | A1* | 9/2017 | Magnusson, Jr | H04L 67/146 |
| 2017/0278144 | A1* | 9/2017 | Carasso | G06F 16/957 |
| 2017/0345063 | A1* | 11/2017 | Bauman | H04L 67/56 |
| 2018/0101507 | A1 | 4/2018 | Malca | |
| 2018/0137546 | A1 | 5/2018 | Kang | |
| 2018/0189824 | A1* | 7/2018 | Yanamadala | H04L 67/34 |
| 2019/0334872 | A1* | 10/2019 | Wang | G06F 16/9535 |
| 2020/0104886 | A1* | 4/2020 | Abdulhayoglu | G06Q 30/0277 |
| 2021/0056596 | A1* | 2/2021 | Boffa | H04L 63/029 |
| 2022/0078161 | A1* | 3/2022 | Zhu | G06Q 30/0277 |
| 2022/0100570 | A1* | 3/2022 | Shang | G06F 16/9566 |

FOREIGN PATENT DOCUMENTS

| | | |
|---|---|---|
| CN | 107547524 A | 1/2018 |
| CN | 107707670 A | 2/2018 |
| CN | 108141478 A | 6/2018 |
| CN | 108366058 A | 8/2018 |
| CN | 108512813 A | 9/2018 |

* cited by examiner

METHOD AND APPARATUS FOR ADVERTISEMENT ANTI-BLOCKING

CROSS-REFERENCE TO RELATED APPLICATIONS

This application is a national phase entry under 35 U.S.C. § 371 of International Application No. PCT/CN2018/112682, filed on Oct. 30, 2018, which claims the priority and benefits of Chinese Patent Application Serial No. CN201811184685.4, filed with the State Intellectual Property Office of P. R. China on Oct. 11, 2018, the entire content of all of which is incorporated herein by reference.

TECHNICAL FIELD

The present disclosure relates to the field of internet technology and, more particularly, to a method and an apparatus for advertisement anti-blocking.

BACKGROUND

Existing browsers often integrate an advertisement blocking plug-in to block advertisements in webpages to enhance user experience. However, this has caused serious losses to various website providers, greatly reducing their advertising revenue.

The content of the webpage is generally composed of resources such as text, pictures, videos, and the like. When a browser is loading the content of the webpage, the browser can initiate an access request for the respective uniform resource locator (URL) of each of the resources to obtain the above-described resources. The advertisement blocking plug-in can identify the above-described URL to be accessed by the browser. If the URL is identified as an advertisement-type URL, the advertisement blocking plug-in can prevent the browser from accessing the URL, and hence the browser cannot obtain the corresponding advertisement content. Thus, the advertisement cannot be displayed. There is a need for a better and less costly method for advertisement anti-blocking.

SUMMARY

In order to solve the problems of existing technology, embodiments of the present disclosure provide a method and an apparatus for advertisement anti-blocking. The technical solutions are described as follows.

In a first aspect, a method for advertisement anti-blocking is provided. The method includes:
receiving a first access request of a terminal for a target webpage, and obtaining webpage content of the target webpage;
rewriting uniform resource locators (URLs) at a plurality of levels in the webpage content into corresponding anti-blocking URLs according to a preset encryption algorithm, and returning rewritten webpage content to the terminal;
restoring the anti-blocking URLs to the URLs at the plurality of levels according to a preset decryption algorithm, when receiving second access requests of the terminal for the anti-blocking URLs; and
obtaining resources pointed to by the URLs at the plurality of levels and returning the resources to the terminal.

Further, the URLs at the plurality of levels include a first-level URL recorded in the webpage content and a multi-level URL recorded by a webpage script in the webpage content; and
rewriting the URLs at the plurality of levels in the webpage content into the corresponding anti-blocking URLs according to the preset encryption algorithm includes:
rewriting the first-level URL in the webpage content to a corresponding anti-blocking URL according to the preset encryption algorithm, and
adding an advertisement anti-blocking script to the webpage content to cause the advertisement anti-blocking script to rewrite the multi-level URL into a corresponding anti-blocking URL in a third access request according to the preset encryption algorithm, when the advertisement anti-blocking script detects that the webpage script initiates the third access request for the multi-level URL.

Further, the advertisement anti-blocking script rewriting the multi-level URL into the corresponding anti-blocking URL in the third access request according to the preset encryption algorithm when the advertisement anti-blocking script detects that the webpage script initiates the third access request for the multi-level URL includes:
determining whether the multi-level URL is a blocking URL according to a preset blocking-rule library, when the advertisement anti-blocking script detects that the webpage script initiates the third access request for the multi-level URL; and
if the multi-level URL is a blocking URL, performing an encoding obfuscation on an advertisement-type URL keyword in the multi-level URL in the third access request according to the preset encryption algorithm, to generate the corresponding anti-blocking URL.

Further, the URL at the plurality of levels includes a first-level URL recorded in the webpage content and a multi-level URL recorded by a webpage script in the webpage content; and
rewriting the URLs at the plurality of levels in the webpage content into the corresponding anti-blocking URLs according to the preset encryption algorithm includes:
rewriting the first-level URL in the webpage content to a corresponding anti-blocking URL according to the preset encryption algorithm, and
loading the webpage script in the webpage content, and rewriting the multi-level URL recorded by the webpage script into a corresponding anti-blocking URL according to the preset encryption algorithm.

Further, rewriting the multi-level URL recorded by the webpage script into the corresponding anti-blocking URL according to the preset encryption algorithm includes:
determining, according to a preset blocking-rule library, whether the multi-level URL recorded by the webpage script is a blocking URL, and
if the multi-level URL recorded by the webpage script is a blocking URL, performing an encoding obfuscation on an advertisement-type URL keyword in the multi-level URL recorded by the webpage script, according to the preset encryption algorithm, to generate a corresponding anti-blocking URL.

Further, rewriting the first-level URL in the webpage content into the corresponding anti-blocking URL according to the preset encryption algorithm includes:
determining, according to a preset blocking-rule library, whether the first-level URL in the webpage content is a blocking URL, and
if the first-level URL in the webpage content is a blocking URL, performing an encoding obfuscation on an advertisement-type URL keyword in the first-level URL in the webpage content according to the preset encryption algorithm, to generate the corresponding anti-blocking URL.

Further, in a second aspect, an apparatus for advertisement anti-blocking is provided. The apparatus includes:

an obtaining module, configured to receive a first access request of a terminal for a target webpage, and obtain webpage content of the target webpage;

a rewriting module, configured to rewrite uniform resource locators (URLs) at a plurality of levels in the webpage content into corresponding anti-blocking URLs according to a preset encryption algorithm, and return rewritten webpage content to the terminal;

a restoring module, configured to restore the anti-blocking URLs to the URLs at the plurality of levels according to a preset decryption algorithm, when receiving second access requests of the terminal for the anti-blocking URLs; and a returning module, configured to obtain resources pointed to by the URLs at the plurality of levels, and return the resources to the terminal.

Further, the URL at the plurality of levels include a first-level URL recorded in the webpage content and a multi-level URL recorded by a webpage script in the webpage content; and the rewriting module is further configured to:
rewrite the first-level URL in the webpage content to a corresponding anti-blocking URL according to the preset encryption algorithm, and
add an advertisement anti-blocking script to the webpage content to cause the advertisement anti-blocking script to rewrite the multi-level URL into a corresponding anti-blocking URL in a third access request according to the preset encryption algorithm, when the advertisement anti-blocking script detects that the webpage script initiates the third access request for the multi-level URL.

Further, the URL at the plurality of levels includes a first-level URL recorded in the webpage content and a multi-level URL recorded by a webpage script in the webpage content; and the rewriting module is further configured to:
rewrite the first-level URL in the webpage content to a corresponding anti-blocking URL according to the preset encryption algorithm, and
load the webpage script in the webpage content, and rewrite the multi-level URL recorded by the webpage script into a corresponding anti-blocking URL according to the preset encryption algorithm.

Further, the rewriting module is further configured to:
determine, according to a preset blocking-rule library, whether the multi-level URL recorded by the webpage script is a blocking URL, and if the multi-level URL recorded by the webpage script is a blocking URL, perform an encoding obfuscation on an advertisement-type URL keyword in the multi-level URL recorded by the webpage script, according to the preset encryption algorithm, to generate a corresponding anti-blocking URL.

Further, the rewriting module is further configured to:
determine, according to a preset blocking-rule library, whether the first-level URL in the webpage content is a blocking URL; and if the first-level URL in the webpage content is a blocking URL, perform an encoding obfuscation on an advertisement-type URL keyword in the first-level URL in the webpage content according to the preset encryption algorithm, to generate the corresponding anti-blocking URL.

In a third aspect, an edge server is provided. The edge server includes a processor and a memory. The memory stores at least one instruction, at least one program, a code set, or an instruction set, and the at least one instruction, the at least one program, the code set, or the instruction set is loaded and executed by the processor to perform a method for advertisement anti-blocking, such as the method for advertisement anti-blocking described in the first aspect.

The beneficial effects brought by the technical solutions provided by the embodiments of the present disclosure are as follows.

In some embodiments, the first access request of the terminal for the target webpage may be received, and the webpage content of the target webpage may be obtained. The URLs at a plurality of levels of the webpage content may be rewritten into corresponding anti-blocking URLs according to a preset encryption algorithm, and rewritten webpage content may be returned to the terminal. When second access requests of the terminal for the anti-blocking URLs are received, the anti-blocking URLs may be restored to corresponding URLs at a plurality of levels according to a preset decryption algorithm. Resources pointed to by the URLs at a plurality of levels may be obtained and returned to the terminal. Thus, using the feature that an edge server or a proxy server can modify cached webpage content, when receiving an access request of the terminal for a webpage, a cache server or a proxy server can rewrite URLs at a plurality of levels of the webpage content, including advertisement-type URLs, into URLs that are not recognizable by the advertisement blocking plug-in. Further, when the terminal subsequently accesses the rewritten URLs in the webpage content, the advertisement blocking plug-in may be invalidated, and thus the edge server or the proxy server can receive the above-described rewritten URLs. The rewritten URLs are then restored to the original URLs at a plurality of levels. Then, the edge server or the proxy server can obtain the resources pointed to by the original URLs at a plurality of levels, such as advertisement resources, and return the resources to the terminal, such that that the terminal can display the advertisements normally. In addition, by performing the above-described advertisement anti-blocking processing on the edge server or the proxy server, the original internal processing logic of the website provider's website may not need to be modified, thereby effectively reducing the cost of advertisement anti-blocking for the website provider.

BRIEF DESCRIPTION OF THE DRAWINGS

In order to more clearly illustrate the technical solutions of the embodiments of the present disclosure, the drawings used for illustrating the embodiments will be briefly described below. It should be understood that the following drawings merely illustrate some embodiments of the present invention. For those of ordinary skill in the art, other drawings can be obtained according to these drawings without any creative work.

DETAILED DESCRIPTION OF THE EMBODIMENTS

In order to make the objects, technical solutions and advantages of the present disclosure clearer, the embodiments of the present disclosure will be further described in detail below with reference to the accompanying drawings.

Figure 1:
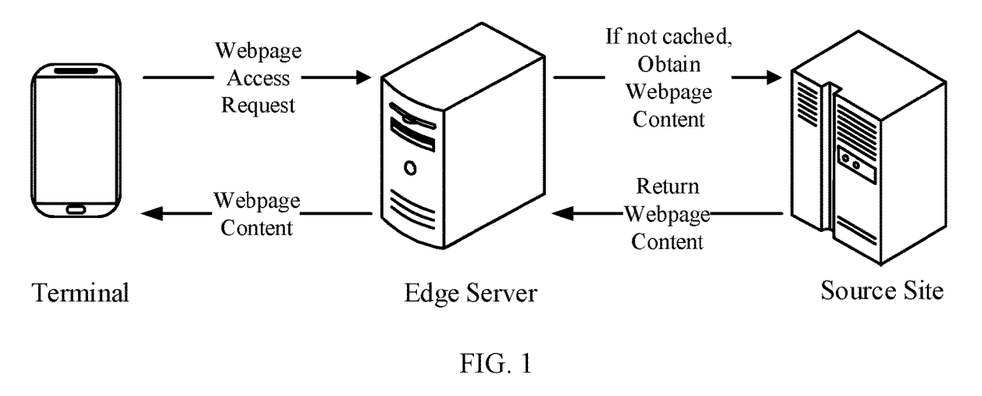
FIG. 1 illustrates a schematic diagram of a network scenario according to an embodiment of the present disclosure.

The embodiments of the present disclosure provide a method for advertisement anti-blocking. The executing entity of the method may be an edge server or a proxy server, and the edge server or the proxy server may be any cache server in a content delivery network (CDN) cluster. The edge server or the proxy server can receive an access request for a webpage from any terminal, such as a smart phone or a tablet, and then return cached webpage content of the webpage to the terminal according to the access request. If the webpage content of the webpage is not cached, the edge server or the proxy server can obtain the webpage content of the webpage from the source site (website provider), and then return the obtained webpage content of the webpage to the terminal. The corresponding network scenario can be as shown in FIG. 1. The above-described edge server may include a processor, a memory, and a transceiver. The processor may be configured to perform advertisement anti-blocking in the following processes. The memory may be configured to store data needed and data generated in the following processing. The transceiver may be configured to receive and send relevant data in the following processing. In some embodiments, illustrations are made using an edge server as an executing entity. The executing entity can also be a proxy server, which is similar to the situation of using an edge server as an executing entity, and the descriptions are omitted.

Figure 2:
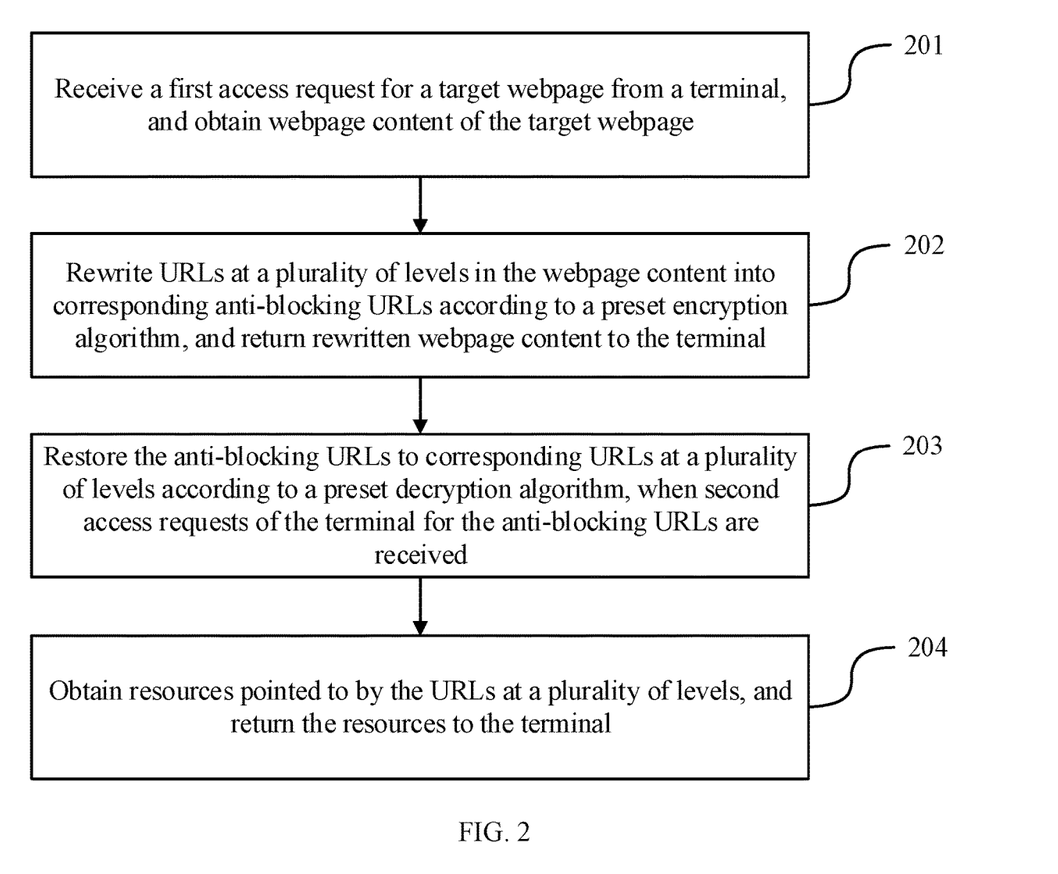
FIG. 2 is a flowchart of a method for advertisement anti-blocking according to an embodiment of the present disclosure.

A processing flow of a method for advertisement anti-blocking shown in FIG. 2 is described in detail below in conjunction with the specific embodiments. The content is shown below.

At Step 201, a first access request for a target webpage is received from a terminal, and webpage content of the target webpage is obtained.

In some implementations, when a user wants to access a webpage, which can be referred to as a target webpage, the user can open a pre-installed browser program on any terminal, and input an uniform resource locator (URL) of the target webpage in an input box of the browser program to initiate an access request (referred to as a first access request) for the target webpage. Further, the terminal can send the first access request to an edge server of a service terminal. The edge server can receive the first access request for the target webpage from the terminal. Then, the edge server can obtain webpage content of the target webpage according to the first access request. Specifically, the webpage content may be HyperText Markup Language (HTML) content. The HTML content may include webpage codes and various types of tags for tagging an image, a video, and other resources, such as a link tag, a script tag, an img tag (i.e., an image tag), etc. An Src (resource) attribute or an href (hypertext reference, for specifying hyperlink target) attribute of each tag can record the URL of the corresponding resource. The corresponding resource can be obtained by accessing the URL.

At Step 202, URLs at a plurality of levels in the webpage content are rewritten into corresponding anti-blocking URLs according to a preset encryption algorithm, and rewritten webpage content is returned to the terminal.

First, the principle of the advertisement blocking plug-in blocking advertisement-type URLs is explained. When the browser initiates an access request for a URL, the advertisement blocking plug-in can integrate a blocking-rule library that records keywords for various advertisement-type URLs, and identify the URLs in the above-described access request in a manner of character-by-character. If an advertisement-type URL keyword recorded in the blocking-rule library is identified, the advertisement blocking plug-in can intercept the above-described access request. If no advertisement-type URL keyword recorded in the blocking-rule library is identified, the advertisement blocking plug-in allows the browser to access the URL.

Based on the above-described principle of the advertisement blocking plug-in blocking advertisement-type URLs, the edge server may encrypt URLs at a plurality of levels of the webpage content according to a preset encryption algorithm, after obtaining the webpage content of the target webpage. For example, an encoding obfuscation may be performed on an advertisement-type URL keyword in the URLs at a plurality of levels, and corresponding anti-blocking URLs are generated, so as to not be identified by the advertisement blocking plug-in. The URLs at a plurality of levels of the webpage content may include a first-level URL and a multi-level URL. The first-level URL may be a URL recorded in the webpage content, such as a URL recorded in the src attribute or href attribute of the above-described tag. The multi-level URL may be a URL recorded by a webpage script in the webpage content. The multi-level URL may be usually recorded in a script content of the webpage script and is not recorded in the webpage content. The webpage script may be a front-end script or an advertisement-affiliate script added by a website provider. When the webpage script is executed, the browser can be called to access the URL recorded in the webpage script (i.e., multi-level URL). Then, the edge server can return the rewritten webpage content to the terminal. It is to be noted that the above-described preset encryption algorithm may be a common encryption algorithm, such as a data encryption standard (DES) algorithm or an advanced encryption standard (AES) algorithm. The above-described preset encryption algorithm may also be a custom encryption algorithm.

Optionally, in one embodiment, the multi-level URLs among the URLs at a plurality of levels may be rewritten on the terminal by using an advertisement anti-blocking script. Accordingly, the partial processing of Step 202 may be as follows. The first-level URL in the webpage content is rewritten to a corresponding anti-blocking URL according to a preset encryption algorithm. Further, the advertisement anti-blocking script is added to the webpage content, such that the advertisement anti-blocking script rewrites the multi-level URL into a corresponding anti-blocking URL in a third access request according to a preset encryption algorithm, when the advertisement anti-blocking script detects that the webpage script initiates the third access request for the multi-level URL.

The URLs at a plurality of levels may include a first-level URL recorded in the webpage content and a multi-level URL recorded by the webpage script in the webpage content.

In some implementations, for the first-level URL, because it is configured and recorded in the webpage content in advance by the website provider, the edge server can directly rewrite the first-level URL when the webpage content of the target webpage is obtained by the edge server. For a multi-level URL, it is not recorded in the webpage content. The multi-level URL is obtained by the webpage script after the browser loads the webpage script in the webpage content. Only thereafter, the multi-level URL can be rewritten. Taking an advertisement-affiliate script as an example of a webpage script, the advertisement of the target webpage can be provided by advertisement affiliates, and the website provider only needs to add the URL for the advertisement-affiliate script developed by the advertisement affiliates to the webpage content to complete advertisement integration. When the browser accesses the URL for the advertisement-affiliate script recorded in the webpage content, the above-described advertisement-affiliate script can be obtained from a corresponding server of the advertisement affiliates and executed. Then, the advertisement-affiliate script can initiate an access request for the multi-level URL of advertisement-type according to the multi-level URL of advertisement-type pre-recorded in the script content, and call the browser to obtain a corresponding advertisement-type resource to complete the loading of the advertisement. Accordingly, based on the latency of the multi-level URL loading, the edge server may add an advertisement anti-blocking script to the webpage content to rewrite the multi-level URL. The advertisement anti-blocking script can detect the third access request initiated by the webpage script for the multi-level URL recorded in the script content, and can rewrite the multi-level URL before the webpage script calls the browser to obtain the resource corresponding to the multi-level URL. Specifically, for the first-level URL, the edge server may rewrite the first-level URL in the webpage content into a corresponding anti-blocking URL according to a preset encryption algorithm. For the multi-level URL, the edge server can add an advertisement anti-blocking script to the webpage content and then return the webpage content including the added advertisement anti-blocking script to the terminal. Thus, when the browser of the terminal loads the advertisement anti-blocking script in the webpage content, the advertisement anti-blocking script can detect whether the webpage script initiates a third access request for the multi-level URL recorded in the script content. When it is detected that the webpage script initiates the third access request for the above-described multi-level URL, the advertisement anti-blocking script may rewrite the multi-level URL to a corresponding anti-blocking URL in the third access request according to a preset encryption algorithm, and then the webpage script may call the browser to access the anti-blocking URL. Thus, the anti-blocking plug-in of the browser cannot identify whether or not the anti-blocking URL is an advertisement-type URL, and the browser can normally access the anti-blocking URL.

Optionally, the multi-level URL of the advertisement-type may be selectively rewritten, and the corresponding processing may be as follows. When the advertisement anti-blocking script detects that the webpage script initiates a third access request for the multi-level URL, it is determined, according to a preset blocking-rule library, whether the multi-level URL is a blocking URL. If so, an encoding obfuscation is performed on the advertisement-type URL keyword in the multi-level URL in the third access request according to the preset encryption algorithm to generate a corresponding anti-blocking URL.

In some implementations, in addition to the advertisement-type URL, the URLs at a plurality of levels in the webpage content may also include a larger number of non-advertisement URLs. If all the URLs at a plurality of levels are rewritten, processing resources of the edge server are to be greatly consumed. Meanwhile, the processing efficiency of the edge server for advertisement anti-blocking is also reduced. Thus, the edge server can integrate a preset blocking-rule library, such as a universal blocking-rule library used by the advertisement blocking plug-in, to determine whether the multi-level URL in the webpage content is an advertisement-type URL, i.e., a blocking URL, and to determine whether to rewrite the URL. Specifically, for the multi-level URL, when the advertisement anti-blocking script detects that the webpage script initiates a third access request for the multi-level URL, the advertisement anti-blocking script can determine, according to each preset advertisement-type URL keyword in the preset blocking-rule library, whether the multi-level URL includes a preset advertisement-type URL keyword. If a preset advertisement-type URL keyword is included, the advertisement anti-blocking script can determine that the multi-level URL is a blocking URL, and further the advertisement anti-blocking script can perform an encoding obfuscation on, according to a preset encryption algorithm, the advertisement-type URL keyword in the multi-level URL in the third access request, and generate a corresponding anti-blocking URL. If the URL is not a blocking URL, the advertisement anti-blocking script may not rewrite the multi-level URL. Thus, system resources of the edge server can be saved, and the processing efficiency of the edge server for the advertisement anti-blocking can be improved. Meanwhile, the hardware requirements on the terminal by the advertisement anti-blocking script, such as an installation environment, can be reduced, and some terminals with lower configuration can also achieve relatively good advertisement anti-blocking performance based on the above-described advertisement anti-blocking script.

Optionally, in another embodiment, the multi-level URL in URLs at a plurality of levels may be rewritten on the edge server. Correspondingly, the partial processing of Step 202 may be as follows. According to a preset encryption algorithm, the first-level URL in the webpage content is rewritten to the corresponding anti-blocking URL; and the webpage script in the webpage content is loaded, and the multi-level URL recorded in the webpage script is rewritten to a corresponding anti-blocking URL according to a preset encryption algorithm.

The URLs at a plurality of levels may include a first-level URL recorded in the webpage content and a multi-level URL recorded by the webpage script in the webpage content.

In some implementations, for the first-level URL in the webpage content, the edge server can rewrite the first-level URL in the webpage content into a corresponding anti-blocking URL according to a preset encryption algorithm, after the edge server obtains the webpage content of the target webpage. Meanwhile, the edge server can access a first-level URL for each webpage script recorded in the webpage content to load the webpage scripts. Then the edge server can rewrite multi-level URLs recorded in the script content of the webpage scripts into corresponding anti-blocking URLs according to a preset encryption algorithm, and cache the rewritten webpage scripts. Then, the edge server can return the rewritten webpage content to the terminal. As such, when the terminal requests to load the webpage script, the edge server may send the cached rewritten webpage script to the terminal, and the rewritten webpage script can call the browser to access the anti-blocking URLs in the rewritten script content.

Optionally, the multi-level URL of advertisement-type may be selectively rewritten, and the corresponding processing may be as follows. According to a preset blocking-rule library, it is determined whether the multi-level URL recorded by the webpage script is a blocking URL. If the multi-level URL recorded by the webpage script is a blocking URL, an encoding obfuscation is performed on the advertisement-type URL keyword in the multi-level URL recorded by the webpage script according to a preset encryption algorithm to generate a corresponding anti-blocking URL.

In some implementations, in order to save the system resources of the edge server and provide the processing efficiency of the advertisement anti-blocking, a preset blocking-rule library may also be integrated to determine on the edge server whether the multi-level URL recorded by the webpage script is a blocking URL. Specifically, after the edge server loads the webpage script in the webpage content, the edge server may determine, according to each preset advertisement-type URL keyword in the preset blocking-rule library, whether the multi-level URL recorded by the webpage script includes a preset advertisement-type URL keyword. If a preset advertisement-type URL keyword is included, the edge server may determine that the multi-level URL is a blocking URL, and the edge server may perform an encoding obfuscation on, according to a preset encryption algorithm, the advertisement-type URL keyword in the multi-level URL recorded by the webpage script to generate a corresponding anti-blocking URL. If the multi-level URL is not a blocking URL, the edge server may not rewrite the multi-level URL recorded by the webpage script.

Further, for the first-level URL, after obtaining the webpage content, the edge server may also determine whether the first-level URL in the webpage content is a blocking URL according to the above-described preset blocking-rule library. If the first-level URL is a blocking URL, the edge server may perform an encoding obfuscation on, according to a preset encryption algorithm, the advertisement URL keyword in the first-level URL in the webpage content to generate a corresponding anti-blocking URL. If the URL is not a blocking URL, the edge server may not rewrite the first-level URL in the webpage content.

At Step 203, when second access requests of the terminal for the anti-blocking URLs are received, the anti-blocking URLs are restored to corresponding URLs at a plurality of levels according to a preset decryption algorithm.

In some implementations, after the terminal receives the website content of the target webpage sent by the edge server, the terminal may sequentially initiate access requests, which can be referred to as second access requests, for the anti-blocking URLs in the website content. Accordingly, when the edge server receives the second access requests initiated by the terminal for the anti-blocking URLs, the edge server may restore, according to a preset decryption algorithm, the anti-blocking URLs to corresponding URLs at a plurality of levels, such as a first-level URL or a multi-level URL. It is to be noted that, in order to restore the rewritten anti-blocking URL, the edge server needs to adopt a preset decryption algorithm corresponding to the above-described preset encryption algorithm. For example, when the preset encryption algorithm is a data encryption standard (DES) algorithm, the preset decryption algorithm is also the DES algorithm.

At Step 204, resources pointed to by the URLs at a plurality of levels are obtained, and the resources are returned to the terminal.

In some implementations, after the edge server restores the anti-blocking URLs to the corresponding URLs at a plurality of levels, the edge server can access the restored URLs, and obtain resources pointed to by the restored URLs, such as texts, pictures, or videos related to advertisements, or other resources. Then, the edge server may return the obtained resources to the terminal. As such, the terminal can perform rendering presentations at the browser interface based on the received above-described resources.

In some embodiments, the first access request of the terminal for the target webpage may be received, and the webpage content of the target webpage may be obtained. The URLs at a plurality of levels of the webpage content may be rewritten into corresponding anti-blocking URLs according to a preset encryption algorithm, and rewritten webpage content may be returned to the terminal. When second access requests of the terminal for the anti-blocking URLs are received, the anti-blocking URLs may be restored to corresponding URLs at a plurality of levels according to a preset decryption algorithm. Resources pointed to by the URLs at a plurality of levels may be obtained and returned to the terminal. Thus, using the feature that an edge server or a proxy server can modify cached webpage content, when receiving an access request of the terminal for a webpage, a cache server or a proxy server can rewrite URLs at a plurality of levels of the webpage content, including advertisement-type URLs, into URLs that are not recognizable by the advertisement blocking plug-in. Further, when the terminal subsequently accesses the rewritten URLs in the webpage content, the advertisement blocking plug-in may be invalidated, and thus the edge server or the proxy server can receive the above-described rewritten URLs. The rewritten URLs are then restored to the original URLs at a plurality of levels. Then, the edge server or the proxy server can obtain the resources pointed to by the original URLs at a plurality of levels, such as advertisement resources, and return the resources to the terminal, such that that the terminal can display the advertisements normally. In addition, by performing the above-described advertisement anti-blocking processing on the edge server or the proxy server, the original internal processing logic of the website provider's website may not need to be modified, thereby effectively reducing the cost of advertisement anti-blocking for the website provider.

Figure 3:
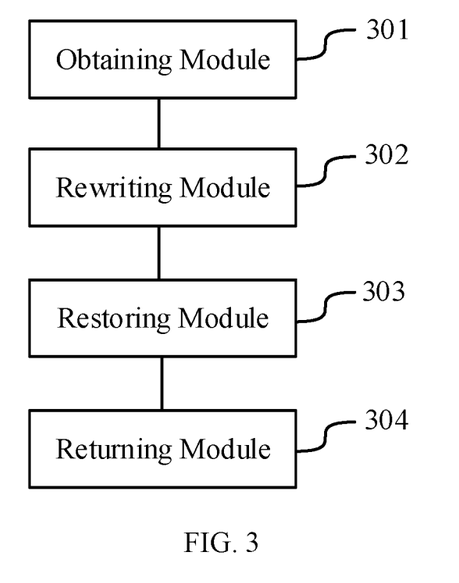
FIG. 3 is a schematic structural diagram of an exemplary apparatus for advertisement anti-blocking according to an embodiment of the present disclosure.

Based on the same technical idea, embodiments of the present disclosure further provide an apparatus for advertisement anti-blocking. As shown in FIG. 3, the apparatus include: an obtaining module 301 configured to receive a first access request of the terminal for the target webpage, and obtain the webpage content of the target webpage; a rewriting module 302 configured to rewrite URLs at a plurality of levels in the webpage content into corresponding anti-blocking URLs according to a preset encryption algorithm, and return the rewritten webpage content to the terminal; a restoring module 303 configured to restore the anti-blocking URLs to corresponding URLs at a plurality of levels according to a preset decryption algorithm, when second access requests of the terminal for the anti-blocking URLs are received; a returning module 304 configured to obtain resources pointed to by the URLs at a plurality of levels, and return the resources to the terminal.

Optionally, the URLs at a plurality of levels may include a first-level URL recorded in the webpage content and a multi-level URL recorded by the webpage script in the webpage content.

The rewriting module 302 may be specifically configured to rewrite a first-level URL in the webpage content to a corresponding anti-blocking URL according to a preset encryption algorithm, and add an advertisement anti-blocking script to the webpage content, such that the advertisement anti-blocking script rewrites multi-level URLs into corresponding anti-blocking URLs in the third access requests according to a preset encryption algorithm, when the advertisement anti-blocking script detects that the webpage script initiates third access requests for the multi-level URLs.

Optionally, the URLs at a plurality of levels may include a first-level URL recorded in the webpage content and a multi-level URL recorded by the webpage script in the webpage content.

The rewriting module 302 is specifically configured to rewrite a first-level URL in the webpage content to a corresponding anti-blocking URL according to a preset encryption algorithm; and load the webpage script in the webpage content, and rewrite a multi-level URL recorded by the webpage script into a corresponding anti-blocking URL according to a preset encryption algorithm.

Optionally, the rewriting module 302 is further configured to determine, according to a preset blocking-rule library, whether the multi-level URL recorded by the webpage script is a blocking URL; and if the multi-level URL recorded by the webpage script is a blocking URL, to perform an encoding obfuscation on advertisement-type URL keywords in the multi-level URL recorded in the webpage script, according to a preset encryption algorithm, to generate a corresponding anti-blocking URL.

Optionally, the rewriting module 302 is further configured to determine, according to a preset blocking-rule library, whether the first-level URL in the webpage content is a blocking URL; and if the first-level URL is a blocking URL, to perform an encoding obfuscation on advertisement-type URL keywords in the first-level URL in the webpage content, according to a preset encryption algorithm, to generate a corresponding anti-blocking URL.

It is to be noted that, when the apparatus for the advertisement anti-blocking provided by the above-described embodiments performs the advertisement anti-blocking, illustrations are provided based on only the divisions of the above-described functional modules. In actual applications, the above-described functions can be assigned to be performed by different functional modules as needed. That is, the internal structure of the apparatus can be divided into different functional modules to complete all or part of the functions described above. In addition, the apparatus for the advertisement anti-blocking in the above-described embodiments and the method for the advertisement anti-blocking in the above-described embodiments correspond to the same idea. For specific implementation processes of the apparatus for the advertisement anti-blocking, references can be made to the method embodiments, and details are not described here again.

Figure 4:
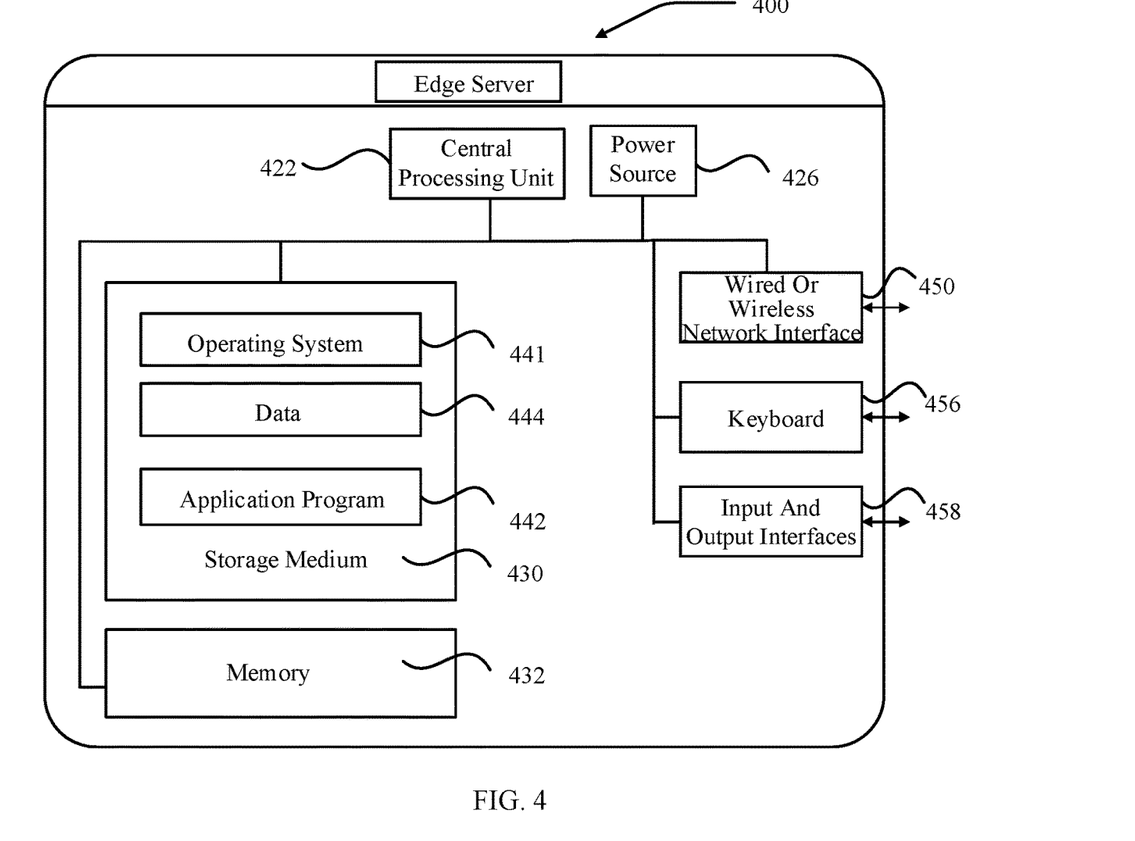
FIG. 4 is a schematic structural diagram of an edge server according to an embodiment of the present disclosure.

FIG. 4 is a schematic structural diagram of an edge server according to an embodiment of the present disclosure. The edge server 400 can vary considerably depending on configuration or performance, and can include one or more central processing units 422, (e.g., one or more processors) and one or more memories 432, one or more storage media 430 (e.g., one or more mass storage devices) for storing application programs 442 or data 444. The memories 432 and the storage media 430 may be volatile storages or persistent storages. The program stored on the storage media 430 may include one or more modules (not shown in the figure), and each of the modules may include a series of instruction operations for the edge server. Still further, the central processing units 422 can be configured to communicate with the storage media 430 to perform on the edge server 400 a series of instruction operations in the storage media 430.

The edge server 400 may also include one or more power sources 426, one or more wired or wireless network interfaces 450, one or more input and output interfaces 458, one or more keyboards 456, and/or one or more operating systems 441, such as Windows Server™, Mac OS X™, Unix™, Linux™, FreeBSD™, and the like.

The edge server 400 may include a memory, and one or more programs. The one or more programs may be stored in the memory. It is configured such that the one or more processors execute the one or more programs including instructions for performing the above-described advertisement anti-blocking.

An ordinary person skilled in the art can understand that all or part of the steps of implementing the above-described embodiments can be completed by hardware, or can be completed by related hardware that is instructed by a program, and the program may be stored in a computer readable storage medium. The above-mentioned storage medium may be a read-only memory, a magnetic disk, an optical disk, or the like.

The above-described embodiments are merely relatively good embodiments of the present invention, and are not intended to limit the present invention. Any modifications, equivalents, improvements, and etc., which are within the spirit and principle of the present invention, are to be included within the protection scope of the present invention.

What is claimed is:

1. A method for advertisement anti-blocking, comprising:
receiving a first access request of a terminal for a target webpage, and obtaining webpage content of the target webpage;
rewriting uniform resource locators (URLs) at a plurality of levels in the webpage content into corresponding anti-blocking URLs according to a preset encryption algorithm, and returning rewritten webpage content to the terminal;
restoring the anti-blocking URLs to the URLs at the plurality of levels according to a preset decryption algorithm, when receiving second access requests of the terminal for the anti-blocking URLs; and
obtaining resources pointed to by the URLs at the plurality of levels and returning the resources to the terminal;
wherein: the URLs at the plurality of levels include a first-level URL recorded in the webpage content and a multi-level URL recorded by a webpage script in the webpage content and the multi-level URL is recorded in a script content of the webpage script;
rewriting the URLs at the plurality of levels in the webpage content into the corresponding anti-blocking URLs according to the preset encryption algorithm includes:
rewriting the first-level URL in the webpage content to a corresponding anti-blocking URL according to the preset encryption algorithm, and
adding an advertisement anti-blocking script to the webpage content to cause the advertisement anti-blocking script to rewrite the multi-level URL into a corresponding anti-blocking URL in a third access request according to the preset encryption algorithm, when the advertisement anti-blocking script detects that the webpage script initiates the third access request for the multi-level URL.

2. The method according to claim 1, wherein:
the advertisement anti-blocking script rewriting the multi-level URL into the corresponding anti-blocking URL in the third access request according to the preset encryption algorithm when the advertisement anti-blocking script detects that the webpage script initiates the third access request for the multi-level URL includes:
  determining whether the multi-level URL is a blocking URL according to a preset blocking-rule library, when the advertisement anti-blocking script detects that the webpage script initiates the third access request for the multi-level URL; and
  if the multi-level URL is a blocking URL, performing an encoding obfuscation on an advertisement-type URL keyword in the multi-level URL in the third access request according to the preset encryption algorithm, to generate the corresponding anti-blocking URL.

3. The method according to claim 1, further comprising:
loading the webpage script in the webpage content, and rewriting the multi-level URL recorded by the webpage script into a corresponding anti-blocking URL according to the preset encryption algorithm.

4. The method according to claim 3, wherein:
rewriting the multi-level URL recorded by the webpage script into the corresponding anti-blocking URL according to the preset encryption algorithm includes:
  determining, according to a preset blocking-rule library, whether the multi-level URL recorded by the webpage script is a blocking URL, and
  if the multi-level URL recorded by the webpage script is a blocking URL, performing an encoding obfuscation on an advertisement-type URL keyword in the multi-level URL recorded by the webpage script, according to the preset encryption algorithm, to generate a corresponding anti-blocking URL.

5. The method according to claim 1, wherein:
rewriting the first-level URL in the webpage content into the corresponding anti-blocking URL according to the preset encryption algorithm includes:
  determining, according to a preset blocking-rule library, whether the first-level URL in the webpage content is a blocking URL, and
  if the first-level URL in the webpage content is a blocking URL, performing an encoding obfuscation on an advertisement-type URL keyword in the first-level URL in the webpage content according to the preset encryption algorithm, to generate the corresponding anti-blocking URL.

6. An apparatus for advertisement anti-blocking, comprising:
  an obtaining module, configured to receive a first access request of a terminal for a target webpage, and obtain webpage content of the target webpage;
  a rewriting module, configured to rewrite uniform resource locators (URLs) at a plurality of levels in the webpage content into corresponding anti-blocking URLs according to a preset encryption algorithm, and return rewritten webpage content to the terminal;
  a restoring module, configured to restore the anti-blocking URLs to the URLs at the plurality of levels according to a preset decryption algorithm, when receiving second access requests of the terminal for the anti-blocking URLs; and
  a returning module, configured to obtain resources pointed to by the URLs at the plurality of levels, and return the resources to the terminal;
  the URL at the plurality of levels include a first-level URL recorded in the webpage content and a multi-level URL recorded by a webpage script in the webpage content, the multi-level URL is recorded in a script content of the webpage script;

the rewriting module is further configured to:
  rewrite the first-level URL in the webpage content to a corresponding anti-blocking URL according to the preset encryption algorithm, and
  add an advertisement anti-blocking script to the webpage content to cause the advertisement anti-blocking script to rewrite the multi-level URL into a corresponding anti-blocking URL in a third access request according to the preset encryption algorithm, when the advertisement anti-blocking script detects that the webpage script initiates the third access request for the multi-level URL.

7. The apparatus according to claim 6, wherein:
the rewriting module is further configured to:
  load the webpage script in the webpage content, and rewrite the multi-level URL recorded by the webpage script into a corresponding anti-blocking URL according to the preset encryption algorithm.

8. The apparatus according to claim 7, wherein the rewriting module is further configured to:
  determine, according to a preset blocking-rule library, whether the multi-level URL recorded by the webpage script is a blocking URL, and
  if the multi-level URL recorded by the webpage script is a blocking URL, perform an encoding obfuscation on an advertisement-type URL keyword in the multi-level URL recorded by the webpage script, according to the preset encryption algorithm, to generate a corresponding anti-blocking URL.

9. The apparatus according to claim 6, wherein the rewriting module is further configured to:
  determine, according to a preset blocking-rule library, whether the first-level URL in the webpage content is a blocking URL; and
  if the first-level URL in the webpage content is a blocking URL, perform an encoding obfuscation on an advertisement-type URL keyword in the first-level URL in the webpage content according to the preset encryption algorithm, to generate the corresponding anti-blocking URL.

10. An edge server, comprising:
a processor, and
a memory,
wherein:
the memory stores at least one instruction, at least one program, a code set, or an instruction set, and
the at least one instruction, the at least one program, the code set, or the instruction set is loaded and executed by the processor to perform a method for advertisement anti-blocking including:
  receiving a first access request of a terminal for a target webpage, and obtaining webpage content of the target webpage;
  rewriting uniform resource locators (URLs) at a plurality of levels in the webpage content into corresponding anti-blocking URLs according to a preset encryption algorithm, and returning rewritten webpage content to the terminal;
  restoring the anti-blocking URLs to the URLs at the plurality of levels according to a preset decryption algorithm, when receiving second access requests of the terminal for the anti-blocking URLs; and
  obtaining resources pointed to by the URLs at the plurality of levels and returning the resources to the terminal;
  wherein: the URLs at the plurality of levels include a first-level URL recorded in the webpage content and a multi-level URL recorded by a webpage script in the webpage content and the multi-level URL is recorded in a script content of the webpage script;

rewriting the URLs at the plurality of levels in the webpage content into the corresponding anti-blocking URLs according to the preset encryption algorithm includes:

rewriting the first-level URL in the webpage content to a corresponding anti-blocking URL according to the preset encryption algorithm, and adding an advertisement anti-blocking script to the webpage content to cause the advertisement anti-blocking script to rewrite the multi-level URL into a corresponding anti-blocking URL in a third access request according to the preset encryption algorithm, when the advertisement anti-blocking script detects that the webpage script initiates the third access request for the multi-level URL.

11. The edge server according to claim 10, wherein:

the advertisement anti-blocking script rewriting the multi-level URL into the corresponding anti-blocking URL in the third access request according to the preset encryption algorithm when the advertisement anti-blocking script detects that the webpage script initiates the third access request for the multi-level URL includes:

determining whether the multi-level URL is a blocking URL according to a preset blocking-rule library, when the advertisement anti-blocking script detects that the webpage script initiates the third access request for the multi-level URL; and if the multi-level URL is a blocking URL, performing an encoding obfuscation on an advertisement-type URL keyword in the multi-level URL in the third access request according to the preset encryption algorithm, to generate the corresponding anti-blocking URL.

12. The edge server according to claim 10, the method for advertisement anti-blocking further includes:

loading the webpage script in the webpage content, and rewriting the multi-level URL recorded by the webpage script into a corresponding anti-blocking URL according to the preset encryption algorithm.

* * * * *